United States Patent [19]
List et al.

[11] Patent Number: 6,079,258
[45] Date of Patent: Jun. 27, 2000

[54] METHOD FOR ANALYZING THE DRIVING BEHAVIOR OF MOTOR VEHICLES

[75] Inventors: Helmut List, Graz; Peter Schöggl, Seiersberg, both of Austria

[73] Assignee: AVL List GmbH, Graz, Austria

[21] Appl. No.: 08/984,028

[22] Filed: Dec. 3, 1997

[30] Foreign Application Priority Data

Dec. 3, 1996 [AT] Austria ........................................ 709/96
Jul. 3, 1997 [AT] Austria ........................................ 411/97

[51] Int. Cl.[7] ........................... B60K 41/00; F02D 41/26; G01M 15/00
[52] U.S. Cl. .............................................. 73/117.3; 701/29
[58] Field of Search ........................... 73/116, 117, 117.2, 73/117.3, 865.9; 701/110, 111, 101, 102, 29, 31, 35

[56] References Cited

U.S. PATENT DOCUMENTS

| | | | |
|---|---|---|---|
| 3,872,846 | 3/1975 | Taplin et al. | 123/119 |
| 4,169,370 | 10/1979 | Iwase et al. | 73/116 |
| 4,438,497 | 3/1984 | Willis et al. | 701/103 |
| 4,915,079 | 4/1990 | Holmes | 701/111 |
| 5,313,388 | 5/1994 | Cortis | 73/116 |

FOREIGN PATENT DOCUMENTS

0217221 4/1987 European Pat. Off. .
0304089 2/1989 European Pat. Off. .

*Primary Examiner*—George Dombroske
*Attorney, Agent, or Firm*—Watson Cole Grindle Watson, P.L.L.C.

[57] ABSTRACT

A method for analyzing the driving behavior of motor vehicle wherein a car's driveability is measured easily on a test stand by conducting tests with an actual vehicle to obtain measurement variables describing driving behavior; then defining at least one rating (Dr) indicating the car's driveability as a function of one or more measurement variables; then preparing a simulation model to represent dependencies between the individual measurement variables and, in particular, to compute the rating (Dr) from a set of predefined measurement variables which can be obtained both from the actual vehicle and on a test stand; and then calibrating a dynamic test stand with the use of the simulation model.

17 Claims, 8 Drawing Sheets

METHOD FOR ANALYZING THE DRIVING BEHAVIOR OF MOTOR VEHICLES

BACKGROUND OF THE INVENTION

This invention relates to a method for analysing the driving behaviour of motor vehicles.

Target variables in developing and optimizing the power system of motor vehicles are emission behaviour, fuel consumption, performance and driveability. In general, driveability is a subjective concept, in particular concerning the behaviour of a vehicle in transient operational states as assessed by the driver. When the accelerator pedal of a car is depressed rapidly the driver will feel more comfortable if acceleration sets in quickly and jerk-free. The same is true for other transient operating conditions, such as a sudden change into overdrive or return from overdrive. Any delays, irregularities or variations in vehicle response as a result of driver-induced changes are usually felt to be irritating. Examples include fore and aft oscillations (surge), delays in response, oscillations in engine speed or tractive power. Positive feelings are evoked by prompt accelerator response, smooth engine power, or quiet and stable idling. A vehicle's driveability is significantly influenced by the engine management, but also by engine suspension and design of the power train as a whole. In view of current attempts to optimize fuel consumption and exhaust emissions, maintaining or increasing driveability must be considered as a further target variable.

It is a problem in this context that objective and reproducible criteria in determining a vehicle's driveability are hard to be found in practice, compared with the determination of fuel consumption or exhaust emissions. A further disadvantage is that in the early stages of vehicle development test vehicles are not usually available, so that transient engine management functions must be optimized on a dynamic test stand. Such tests have not been successful so far in producing reliable ratings of a vehicle's driveability.

A conventional test procedure permits driveability assessments when an actual vehicle with defined engine management program is available. It will not be possible in practice, however, to test a multitude of different engine settings in this manner. On the other hand, test bed simulations of a vehicle's power train are not yet refined enough to yield reliable driveability ratings.

For these reasons driveability ratings have so far been made during the later stages of vehicle development, based on subjective assessments of experienced test drivers. With the use of time-consuming test routines a sequence of driveability-relevant maneuvres are performed; vehicle behaviour is rated on answer sheets. Due to the subjective character of such ratings their reproducibility is only limited, however.

DESCRIPTION OF THE PRIOR ART

In U.S. Pat. No. 4,169,370 a procedure and device are disclosed for frequency-selective recording of oscillations in vehicles. The device essentially comprises an acceleration sensor, a band-pass filter with a permanently set center frequency of approximately 4 Hz, and an evaluation unit for computation of the root mean squares. Although it is possible with this device to approximately simulate the subjective human perception of oscillations for a frequency of some 4 Hz, other frequencies and other variables influencing driveability are not taken into account by the invention. As a consequence, no complete driveability evaluation will be possible. One of the reasons for this is that the occurrence of certain oscillations will be assessed by a driver quite differently, depending on the prevailing driving situation.

Another restriction is that the known procedure and device are limited to the use in test vehicles. Using the procedure in a test bed situation is not possible.

SUMMARY OF THE INVENTION

It is an object of this invention to propose a method for analyzing the driving behaviour of vehicles, and in particular vehicle oscillations, which will permit a reliable and reproducible determination of vehicle driveability, without having to conduct all tests with the use of a real vehicle.

The method of the invention comprises the following steps:

Conducting tests with the use of a real vehicle to obtain measurement variables on its driving performance.

Continuous monitoring to check whether predefined trigger conditions are fulfilled, i.e., whether a certain set of variables takes on certain values.

If trigger conditions are fulfilled, computation of at least one rating (Dr) representing vehicle driveability, from one or more measured values, using a predefined functional relationship.

Output of the rating (Dr).

In the first step a test driver is subject to a test program in the actual vehicle. Although he is not expected to adhere to a precisely defined driving cycle during testing, the driving cycle conducted should essentially correspond to normal operation. Engine-related and vehicle-related data are recorded as time series during driving operation. Relevant engine-related data are engine speed (rpm), position of throttle or accelerator pedal, intake manifold vacuum, coolant temperature, ignition timing, injection volume, lambda value, exhaust gas recirculation rate, exhaust gas temperature. Vehicle-related values include vehicle speed and longitudinal vehicle acceleration.

In the second step individual driving states or maneuvers are identified by means of previously defined trigger conditions. "Tip-in", for example, is defined as a state in which a sudden opening of the throttle takes place following conditions of low speed and low load. Other driving states or maneuvers are idling, shifting of gears, etc. For each such state trigger conditions are defined, i.e., certain variables taking on certain values, from whose occurrence the presence of a particular driving state may be inferred. In an analysis of the recorded test data a given driving state may be assigned to individual timings. In this manner it may be determined, for example, at which points in time during a test drive a tip-in process has taken place. For each of these points a rating may be defined on the basis of one or several measured values. For optimum correspondence of this rating with the subjective "feelings" of the vehicle drivers, it is preferably provided that statements of test drivers concerning the vehicle's driveability be evaluated statistically. The test drivers are asked to give detailed information on the vehicle's behaviour during individual operational states. The rating is selected such that it will reflect the drivers' assessments as accurately as possible. The division of operational states may be further refined by providing each operational state with its immediately preceding operational state which may also influence vehicle behaviour. In this way the number of potential states will be multiplied.

In the third step the rating is computed in real time as a function of one or several measured variables. According to a preferred variant of the invention, the oscillation amplitude of longitudinal vehicle acceleration at a characteristic surge frequency is used as such a rating. The way in which such an oscillation amplitude is derived will be described in detail below.

In a final step the computed rating is put out.

It is an essential feature of this invention that the available measurement variables are given different ratings depending on the particular driving situation prevailing, in order to determine vehicle driveability. In this way it will be possible to obtain a result that will closely correspond to the subjective ratings delivered by test drivers.

In a specially preferred variant of the method of the invention a simulation model is prepared to exhibit the dependencies between individual measurement variables and, in particular, to compute the rating from a set of predefined measured variables, which can be obtained both with the actual vehicle and on a test stand, and a dynamic test stand is calibrated with the use of the simulation model. For such a simulation model a multimass oscillator may be employed whose parameters are chosen to fit a certain vehicle or group of similar vehicles.

In a preferred way the simulation model is used to represent dependencies between the individual measured variables, and in particular to compute the rating from a set of predefined measured variables which can be obtained both with the actual vehicle and on a test stand; and further to calibrate a dynamic test stand by means of the simulation model.

Test stands normally do not provide all measured values required for computing the rating. For this reason any variables which can only be measured on the actual vehicle must be inferred from the variables which are obtainable on the test stand. The simulation model is improved with the use of the actual vehicle until the values computed by the simulation model are in close correspondence with the values actually measured.

In the final step of the preferred variant the simulation model is used for calibration of the dynamic test stand.

In another preferred variant of the invention the rating employed is the oscillation amplitude of longitudinal vehicle acceleration for characteristic surge frequencies. Surge frequencies are frequencies of longitudinal vehicle acceleration that are caused by transient operational states of the engine.

In a special variation the invention refers to a method of analysing vehicle oscillations comprising the following steps:

Determining surge regions during operation of the actual vehicle, using a characteristic measurement variable, such as longitudinal acceleration.

Determining the vehicle's operational state in the surge regions.

Dividing the surge regions into a first measuring region and a second measuring region following the first one.

Determining a frequency spectrum of the characteristic measurement variable.

Determining a frequency within a predefined frequency range, which exhibits the largest difference in the frequency spectrum of the first measuring region relative to the second measuring region.

Storing the frequency obtained in the previous step as characteristic surge frequency, together with data on the operational state of the vehicle.

Preparing a simulation model for the vehicle, in particular for the vehicle power train.

Running tests on a test stand with the use of the simulation model obtained in the previous step, simulating various operational states of the vehicle, and determining a suitable damping value for the respective characteristic surge frequency in each operational state of the vehicle.

Storing the respective damping value in dependence of the prevailing operational state.

During driving there are special transitional states in which the occurrence of surge is to be expected. One such state of transition is induced by quickly depressing the accelerator pedal, for example. A suitable evaluation circuitry will identify such critical states as surge regions.

Basically, the relevant operational states of a vehicle are recorded during a test drive. The relevant signal for assessing driveability is the longitudinal acceleration of the vehicle body. In the second step further relevant operating states are recorded within each surge region, preferably engine speed, load (i.e., position of the throttle valve), and the chosen gear level.

The essential feature of this variant is that the surge-relevant signals are suitably filtered from the test data. In this respect the invention is based on the finding that a surge region is characterized by the presence of primarily engine-dependent interferences, which are effective during a first time period but will have faded out after a certain time. For this reason the surge region is subdivided into two measuring regions in the third step, and the assumption is made that the surge-relevant signal is present in the first measuring region but absent in the second measuring region. It may be assumed that the surge will die down approximately 0.8 to 2.5 seconds after the respective change. In most cases fade-out will take 1 to 2 seconds.

In the fourth step a frequency spectrum is obtained for the first measuring region and another one for the second region. The frequency spectrum is preferably computed by a Fast Fourier Transformation (FFT).

It has been found that the characteristic surge frequency lies within a certain frequency range, i.e., approximately between 2 and 7 Hz. By subtracting the frequency spectra of the two measuring regions from each other, those noise components of the signal which are caused by other influencing factors, such as vibrations due to tires, engine, chassis, wind, road, etc, may be filtered out. With the use of the peak value of the amplitude the characteristic surge frequency may be determined in the fifth step.

The characteristic surge frequency depends on the prevailing operational state of the vehicle. For this reason this frequency is stored in the sixth step together with data on the operational state. As mentioned above, these data typically are engine speed, engine load, and chosen gear level. The amplitude at the characteristic surge frequency is also stored.

To permit testing on a test stand, a simulation model is prepared for the vehicle in a known manner. The test stand simulates a dual or multiple mass oscillator in which vehicle mass, stiffness of the power train and transfer quality of the tires are represented. To obtain ratings on vehicle driveability, however, damping must also be simulated on the test stand in a suitable way. A vehicle's damping values will depend on its operational state and cannot be directly obtained from the vehicle data. Rather, it is necessary that the individual operational states previously recorded as test points obtained from the actual vehicle, be reproduced on the test stand, each surge frequency found being set individually.

Damping may be determined on the test stand in the eighth step, by varying the damping value until the oscillation amplitude measured on the test stand is in accordance with the oscillation amplitude measured on the actual vehicle. In this manner the test stand is calibrated by establishing a damping characteristic, thus permitting a driveability index to be determined on the test stand, which is in accordance with that obtained from the actual vehicle. After the test stand has been calibrated in this way, parameters of the engine management can be varied. Since the characteristic surge frequency is largely independent of the engine setting it will remain unchanged even when such variations are made. As a consequence the test stand will yield reliable information on vehicle driveability as a function of different engine settings. Since automated test stand simulations are much faster and less expensive than tests with the actual vehicle, the present invention presents a considerably simplified method of optimizing engine management. It will thus be possible to include driveability in optimization testing as a further target variable in addition to fuel consumption and exhaust gas emissions.

Driveability assessment is predominantly based on measured values which can be obtained from the actual vehicle but not on a dynamic test stand. One such example is longitudinal vehicle acceleration. During the training phase of the system these values, which are not attainable on the test stand, are measured in the vehicle and computed from the simulation model. By forming the difference between measured and computed values, an error is determined. In the system training phase the computation algorithm of these values is modified until the error reaches a minimum. The trained system is installed on the dynamic test stand. It is thus possible to simulate a special vehicle type. In the early phases of development, when no vehicle is available, reference data of similar vehicle types may be used.

In this way the procedure may be employed in dynamometer testing, i.e., on engine and power train test stands, at an early stage of development.

It may further be provided that the ratings be determined by an assigning system in a country-specific way. This will permit the specific requirements and drivers' demands of individual countries to be taken into account. While some countries prefer a comfortable driving style, for instance, others will be more sporty. Such preferences may be taken into consideration by adjusting computation parameters of iterative equations or by weighting factors.

The results of these computations, i.e., a large number of individual ratings of different driving states, are stored together with the corresponding trigger conditions available, i.e., the predefined operational states of engine and/or vehicle. From all individual ratings a relevant rating of overall driveability is computed.

The device of the invention for rating the driveability of vehicles comprises the following elements:

A measuring system with transducers to determine at least one engine- and/or vehicle-related measurement variable relevant for driveabilty, from the group of engine speed, throttle position, accelerator pedal position, vehicle speed, longitudinal vehicle acceleration, intake manifold vacuum, coolant temperature, ignition timing, injection volume, lambda value, exhaust gas recirculation rate, exhaust gas temperature, including recording electronic.

A data storage system with data on the operational state of engine and/or vehicle, and of correlated ratings of driveability.

An assigning system for assigning ratings on vehicle driveability to the data describing the operational state of engine and/or vehicle.

An evaluation unit for comparing measured and stored data, and for determining driveability ratings with the use of the assigning system.

The data storage system contains the trigger conditions required for rating, as well as the results of the computations.

The necessary routines of the evaluation logic are preferably stored in a program. The stored driveability-relevant driving states, which are stored as trigger conditions, and the computed driveability results constitute a data record.

The above device may be configured as an instrument measuring and rating the driveability of vehicles into which it is integrated. By means of such an instrument one vehicle type may be compared to others with regard to driveability performance. In addition, a given vehicle may be examined for service purposes with regard to ageing or potential failures which would affect vehicle driveability. In vehicle production such a device may be employed for quality control.

Alternatively, such a device could be permanently integrated in the vehicle to provide the driver with feedback on the state of the vehicle.

To monitor driveability testing and inform on the length of time still required for testing, it is proposed that the device be provided with a counter indicating the number of operational states that have already been covered out of the group of operational states predefined in the data storage system.

In principle, all oscillations occurring in longitudinal direction of the vehicle are felt to be more or less irritating. One exception is actual vehicle acceleration, whose frequencies usually are below 0.5 Hz. Also accepted are engine-generated vibrations which have nothing to do with surge oscillations, and have frequencies of 6 Hz and more, approximately. It is therefore provided in a preferred variant that frequencies smaller than 0.5 Hz, and greater than 8 Hz, or preferably 6 Hz, be omitted from data recording and evaluation. For this purpose filters passing or blocking certain frequency bands may be employed.

Information on later vehicle driveability may be obtained by means of the invention at a very early stage of vehicle development; tuning of engine management parameters follows criteria of fuel consumption, exhaust gas emissions, and driveability. As a result, shorter development times and improved tuning quality are attained. In addition, emission quality will improve upon tuning.

The system may be operated both on-line and off-line.

DESCRIPTION OF THE DRAWINGS

Following is a more detailed description of the invention as illustrated by the accompanying drawings, in which.

DETAILED DESCRIPTION OF THE PREFERRED EMBODIMENTS

Figure 1:
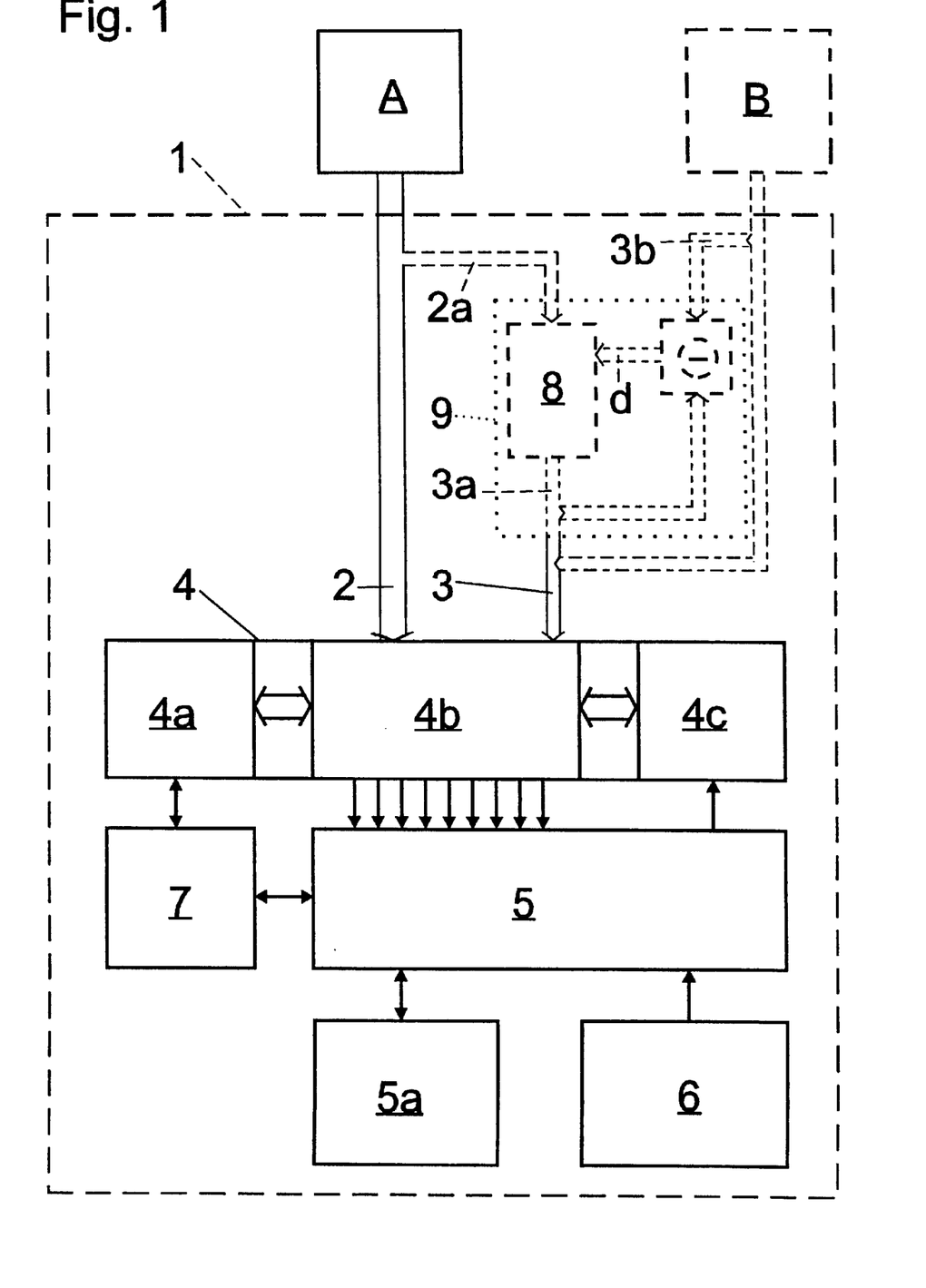
FIG. 1 represents a block diagram of the device described by the invention.

The system 1 is installed in the vehicle being tested where it will measure automatically, without requiring operator attendance, the driveability-relevant measurement variables 2, 3 of operational states of engine A and/or vehicle B, such as engine speed, position of throttle or accelerator pedal, vehicle speed, longitudinal vehicle acceleration, intake manifold vacuum, coolant temperature, ignition timing, injection volume, lambda value, exhaust gas recirculation rate, exhaust gas temperature. The measured data 2, 3 are permanently stored in storage cells 4b of the data storage unit 4. Driveability-relevant, stationary and dynamic states of these measured variables, i.e., so-called trigger conditions 4a, are also stored in the data storage unit 4. If the measured data 2, 3 are in agreement with the stored trigger conditions 4a, the evaluation unit 5 will initiate a predefined, mathematical and statistical evaluating process in a subunit 5a. This evaluation includes a complete, objective, and reproducible simulation of the driver's personal assessment of the current driving state. The computation process and the connection between momentary measurement data and subjective driveability assessment is stored in an assigning system 6 as result of a multitude of measurements and correlations between subjective rating and objective measurement data. The results of the computations are stored in predefined storage cells 4c of the data storage unit 4 in a fully automated process.

The system 1 may be permanently employed in actual road operation. As the driver need not pay any attention to the system 1, the car ride may serve additional purposes not related to the testing procedure. In order to obtain a driver-, vehicle-, and route-relevant driving profile the number of trigger conditions 4a detected is analyzed and stored. Among other purposes this result may be used for better tuning, in the development and calibration phase, of driving states which often occur in practical operation.

A counter 7 counts the number of predefined trigger conditions already detected, and supplies information on the length of time required for measurement as a function of desired analyzing accuracy.

Multiply detected trigger conditions 4a are evaluated statistically, for example, by forming the mean value of computed results, or filtering out atypical resuls.

The measuring time required for a total vehicle analysis is several hours. At the end a complete set of data will be available for driveability assessment. Via a statistical evaluation a representative driveability rating can be formed from the total set of data.

If desired, a measurement and analysis of selective vehicle states, such as idle, full load, or similar, may be conducted for calibration purposes. In this case only the individual results will be made available.

In on-line operation the system 1 may be designed as a self-learning system. If driving states occur which are not predefined in the computing unit via the trigger conditions 4a, but whose evaluation would yield a very bad or very good driveability rating, they are recorded in combination with the result and marked for evaluation. For the next measurement the trigger conditions 4a learned in this way will thus be predefined.

In off-line operation evaluation results can be displayed in the form of tables and graphs. By supplying threshold results it will be possible to emphasize evaluation results that may be worse than the threshold values. Learned trigger conditions 4a may be shown separately, if necessary. Off-line operation will also permit a simple comparison between current and preceding measurements, and the effects of changes can be studied immediately. Moreover, the results can also be compared to the measured results obtained with other vehicles of a similar type.

It is a special advantage of this invention that a first driveability assessment will be possible on the dynamic test stand. In an embodiment of the invention a unit 8 (represented by broken lines in FIG. 1) is used for this purpose, which simulates driveability-relevant vehicle test data 3 that are not available on the dynamic test stand, such as longitudinal acceleration of the vehicle, by using engine-related substitute data 2a, such as engine vibration, bearing reaction force, etc.

Special preference is given to a variant of the invention in which the system 1 is used together with a self-learning vehicle simulation unit 9 (represented by dotted lines in FIG. 1). A self-learning vehicle simulation unit 9, built of neural nets, for example, will fully simulate vehicle properties. The vehicle simulation unit 9 can be trained and calibrated during actual vehicle operation. The vehicle data 3a simulated by means of engine-related substitute data 2a are compared to actual vehicle test data 3b in several operation points, for instance in an iterative procedure, and the difference d is fed into the unit 8 for simulation of vehicle test data. Based on the difference d the parameters of the simulation algorithm used are corrected and updated. After the vehicle test data have been simulated with satisfactory accuracy, the trained vehicle simulation unit 9 may be used on the dynamic engine test stand for the driveability rating procedure. In this manner an accurate vehicle simulation will be available for use on the dynamic test stand. The vehicle simulation unit 9 is preferably configured as a plug-in module of the system 1. This will permit a rapid change or conversion from training to testing unit.

The system 1 may further be used with automatic calibrating programs for determination of parameters in engine management systems. This will permit integration of driveability information for rapid stationary and dynamic calibration.

The rating procedure will now be explained with reference to a concrete example, a "tip-in" maneuver performed in second gear, i.e., an acceleration process during which the throttle is gradually opened.

Figure 2:
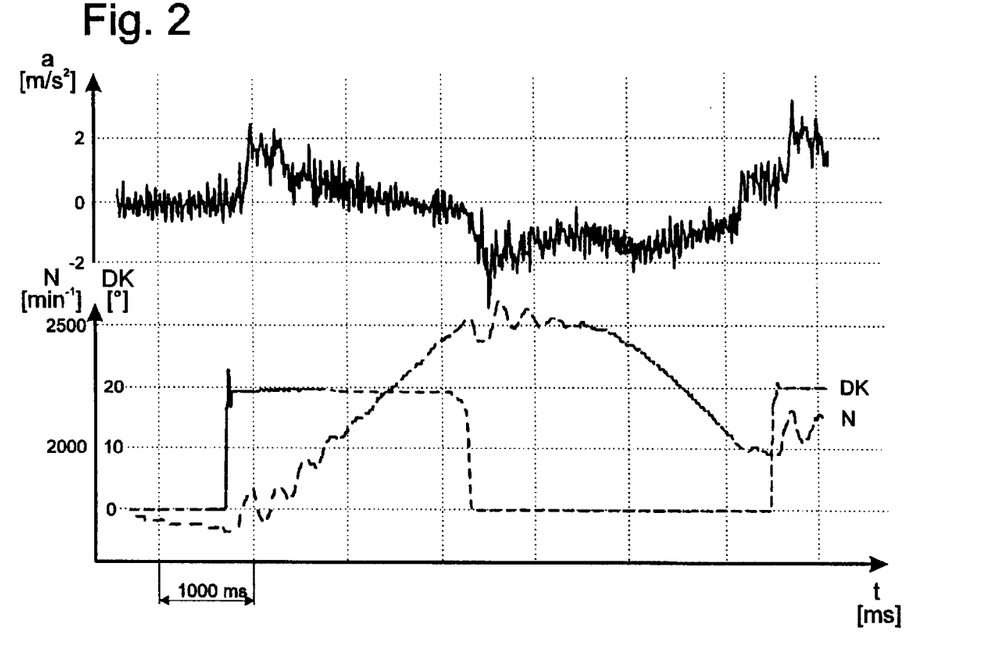
FIG. 2 a measurement chart for the variables throttle position, acceleration and engine speed.

First of all, the throttle position DK, engine speed N, and longitudinal acceleration a are measured over time for the tip-in case in road operation (see FIG. 2). At the same time the subjective ratings of test drivers are recorded. A ten-point rating scale from excellent=10 to extremely bad=1 is used for evaluation.

Figure 3:
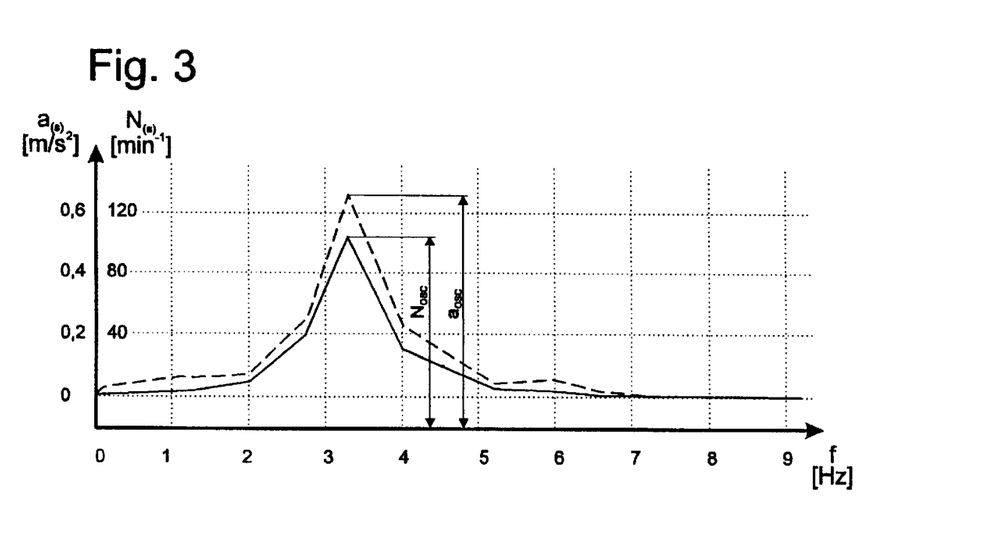
FIG. 3 a diagram with the variables acceleration and engine speed resulting from an FFT.

In the next step the engine speed N and longitudinal acceleration a are processed. The computations involved are FFT (Fast Fourier Transformation) of engine speed N and longitudinal acceleration a, as shown in FIG. 3. It is seen clearly that peak amplitudes occur in the 3–4 Hz region in this instance.

The maximum value of the surge oscillations in the frequency range of 2–8 Hz and the frequency at which the maximum value occurs, are computed using the following equation:

$$a(s) = \int_{-\infty}^{\infty} e^{-ist} a(t) dt \qquad (1)$$

st representing the imaginary part and a(t) acceleration a as a function of time.

In a further step a correlation is established between subjective assessment and the FFT amplitudes of longitudinal acceleration using the following equation:

$$Dr = \frac{c1}{\sqrt{c2.a_{osc}^3}} \qquad (2)$$

c1, c2, c3 representing parameters, $a_{osc}$ the peak amplitude of the surge oscillation in the 2–8 Hz range, and Dr the computed driveability index. Coefficients c1, c2, c3 may be automatically obtained in a self-learning system. For example, iteration loops may be used, in which the coefficients are varied until the deviation of computed value Dr and subjective rating $Dr_{subj}$ assumes a minimum. The following equations are used for this purpose:

$$c1_{i+1} = c1_i + p_i \qquad (3)$$

$$c2_{i+1} = c2_i + q_i \qquad (4)$$

$$c3_{i+1} = c3_i + r_i \qquad (5)$$

$p_i$, $q_i$, and $r_i$ representing variation step sizes. c1, c2, and c3 are varied until the difference between computed driveability index Dr and subjective driveability index $Dr_{subj}$ is smaller than a predefined threshold value.

After completion of system training the subjective rating process in the vehicle may be fully simulated using the amplitudes $a_{osc}$ of the surge oscillations. The obtained coefficients c1, c2, c3 will simulate the subjective rating. It will thus be possible to account for country-specific, national characteristics. In countries preferring a comfortable driving style with a tendency towards longer response times, the ratings will differ from those of countries preferring a more sporty driving style. The system may also be employed for assessing the driving styles of individual drivers.

The computing process shown in this paper is only one of numerous ways of performing an evaluation. For the iteration process other mathematical or statistical procedures could also be used.

On the dynamic test stand longitudinal acceleration is not available as a measured variable. In this case the acceleration signal a is simulated with the use of the available signals for engine speed N and engine torque. The engine speed N is the only signal readily available both on the dynamic test stand and in the vehicle itself; measuring torque in comparison requires much more effort and expense.

For simulation of the longitudinal acceleration a with the use of engine speed N another self-learning system is employed. In a first step a correlation is formed between the engine speed signal N and the longitudinal acceleration a, for instance, in an iteration procedure. In a second step the longitudinal acceleration signal a is generated from the engine speed N on the dynamic test stand.

Other relevant variables, such as idle quality, cruising, full load acceleration, change of gear, warm-up performace, starting, etc., are evaluated in the same manner as the tip-in rating described above. In addition, relevant time-related variables, such as delay times, may be taken into account. Examples of such delay times include delayed gas response, delay in engine braking after the throttle has been closed, or rpm overshoots during gearshifting, in which instance the engine speed will increase instead of dropping after disengagement of the clutch, even if the throttle is closed.

Figure 4:
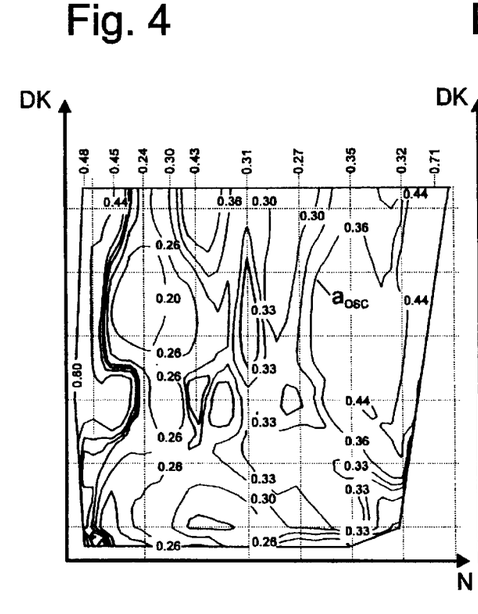
FIGS. 4 and 5 throttle position/engine speed diagrams with surge events indicated.
Figure 5:
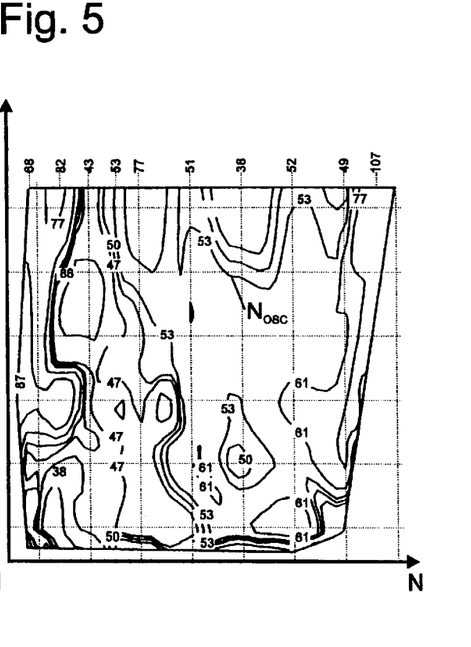

FIGS. 4 and 5 show characteristics of peak amplitudes $N_{osc}$ and $a_{osc}$ occurring in the tip-in state, for the surge oscillations of engine speed N and longitudinal acceleration a, plotted over the engine speed N and the maximum throttle position DK during tip-in.

Figure 6:
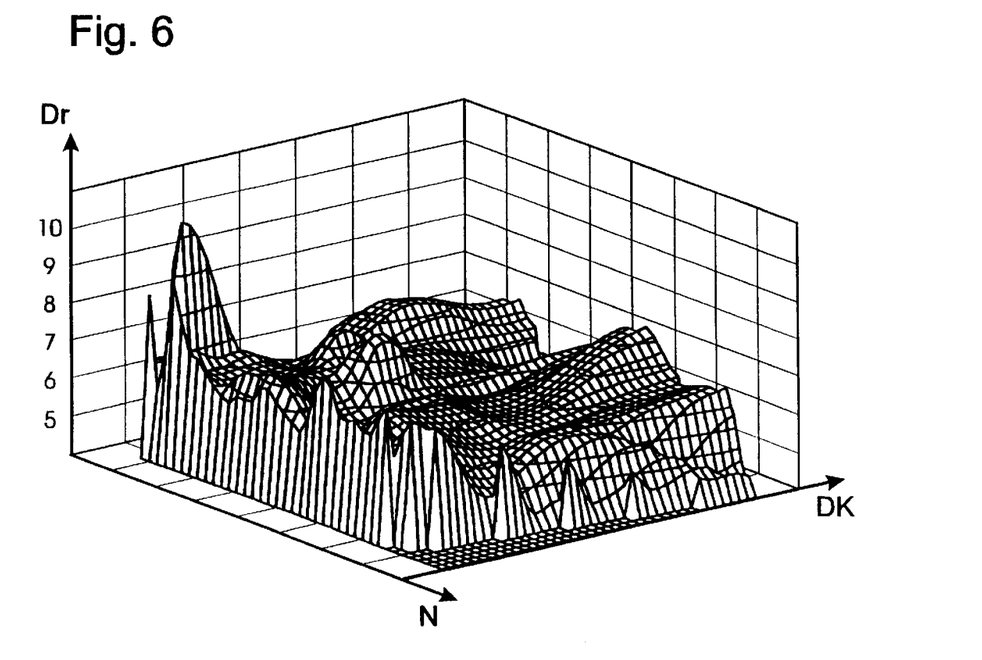
FIG. 6 a 3-D diagram with computed driveability rating.

The result of the rating process for tip-in operation is the characteristic diagram of FIG. 6, in which the driveability rating Dr is plotted over the engine speed N and the throttle position DK. For the driveability rating Dr in the characteristic the following scale is used:

10 . . . not irritating for very experienced test drivers

9 . . . irritating for very experienced test drivers

8 . . . irritating for critical drivers

7 . . . irritating for some drivers

6 . . . irritating for all drivers

5 . . . very irritating for all drivers

Figure 7:
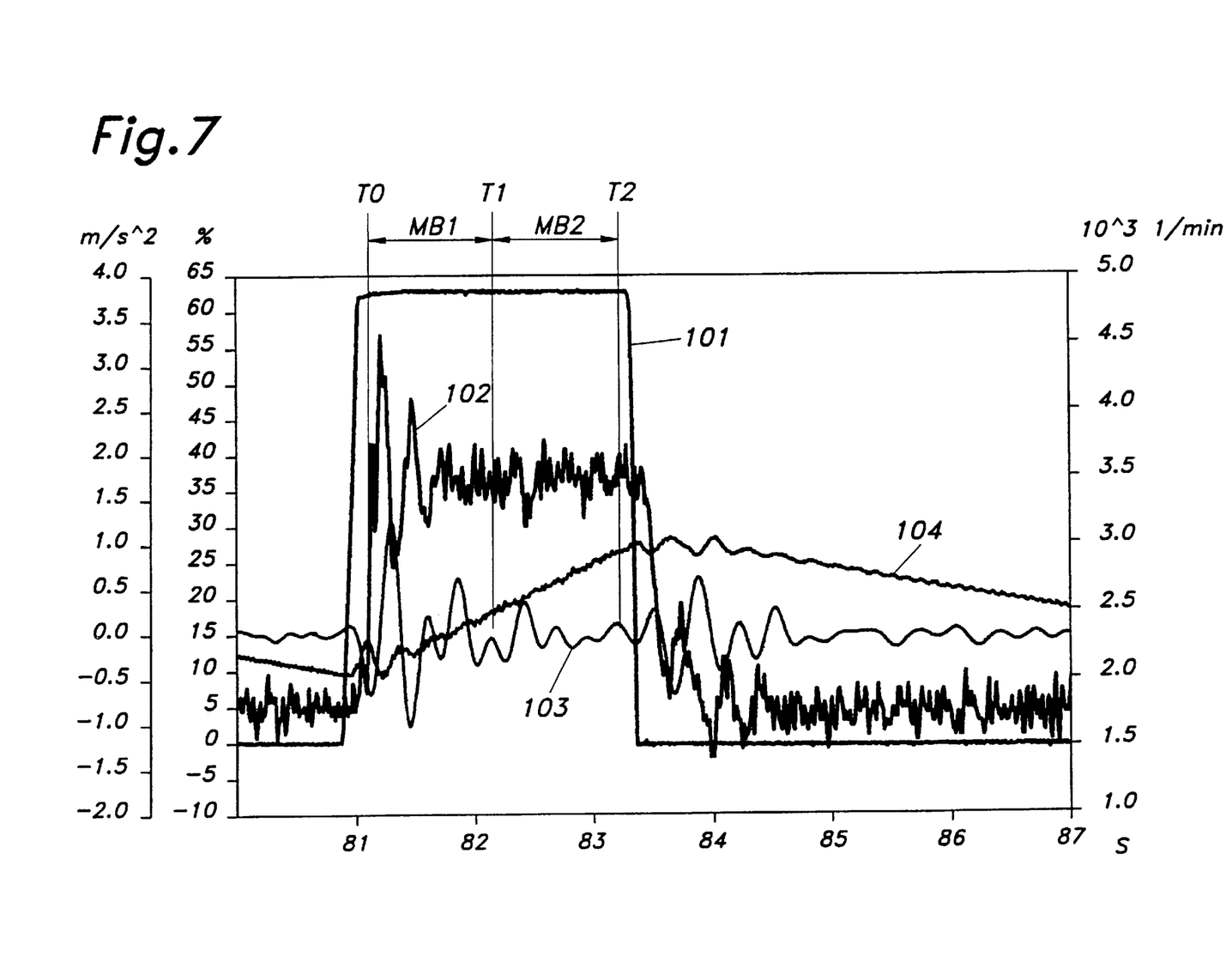
FIG. 7 a diagram of diverse measurement variables over time.

In FIG. 7 several measured variables are plotted over time. 101 refers to the position of the throttle valve. The resulting acceleration in m/s² has the reference numeral 102, filtered acceleration is 103, and engine speed is 104. A characteristic surge region in this diagram arises by opening the throttle from zero position to greater than 60% directly after second 81. At about second 83.5 the throttle is closed once more completely. By means of suitable evaluation circuitry the surge region is defined as a time period between points in time T0 to T2. This surge region T0–T2 is further divided into a first measuring region MB1 and a second measuring region MB2. The first measuring region MB1 ranges from time point T0 to a time point T1, whereas the second measuring region MB2 is selected between time point T1 and time point T2. In this example the duration of the first measuring region MB1 is set at one second.

Figure 8:
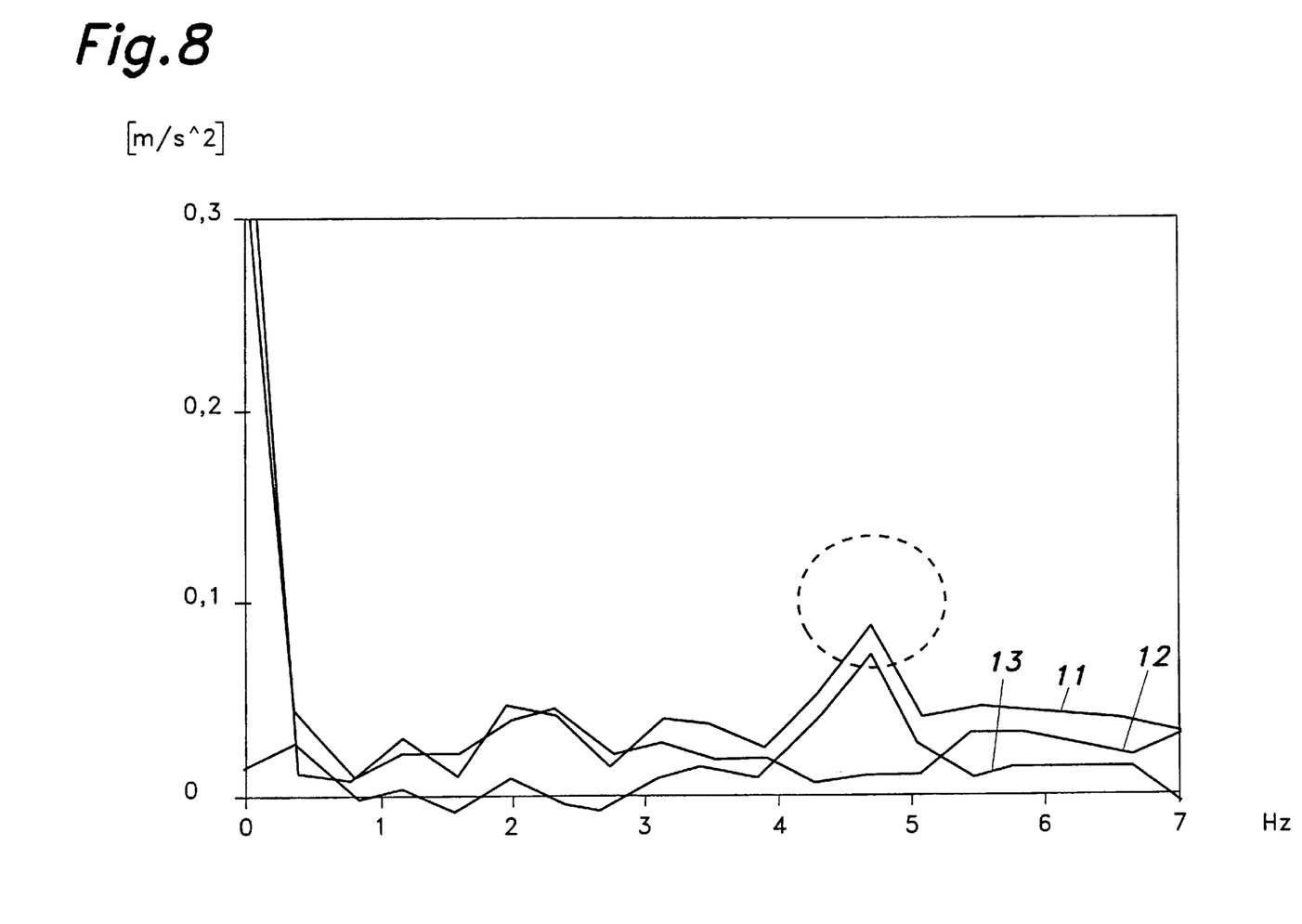
FIG. 8 a diagram showing the oscillations of longitudinal vehicle acceleration in the frequency domain.

In the diagram of FIG. 8 the frequency in Hz is plotted on the horizontal axis, and the amplitude of acceleration oscillations for the respective frequency is plotted on the vertical axis. FIG. 8 thus exhibits frequency spectra of acceleration. The spectrum obtained from the first measuring region has the reference numeral 11, that from the second region is referred to as 12. The difference of the two spectra is referred to as 13. As is seen, the difference of the spectra has a significant maximum within an expectancy region of 2–7 Hz. In FIG. 8 this maximum is at a frequency of 4.7 Hz.

In the course of recording measured values during road operation of an actual vehicle a large number of test points are obtained for different values of engine speed, throttle position, and selected gear.

Figure 9:
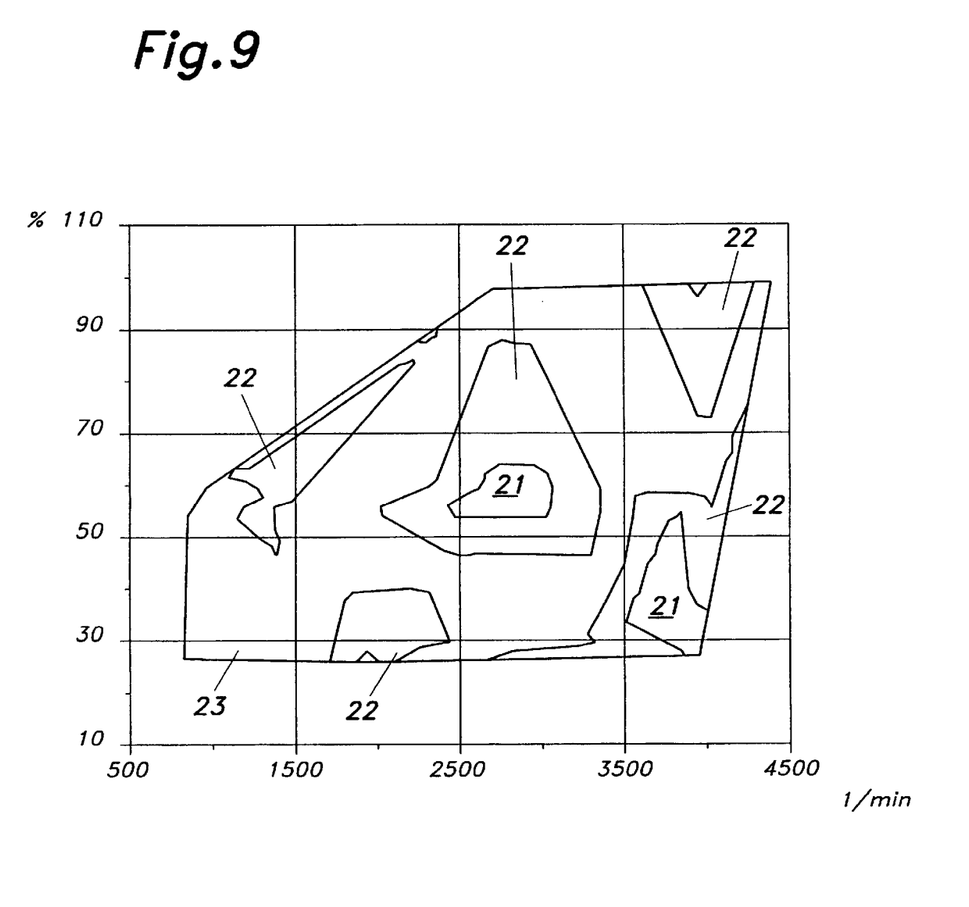
FIG. 9 a diagram showing characteristic surge frequency as a function of engine speed and load.

FIG. 9 presents a characteristic diagram for a certain gear level, which has been obtained from these tests. On the horizontal axis engine speed (rpm) is plotted in units of 1/min, while the throttle position in percent is plotted on the vertical axis. Regions 21 are characterized by a characteristic surge frequency of 3.5 to 4 Hz, regions 22 by a characteristic surge frequency of 4 to 4.5 Hz and regions 23 by a characteristic surge frequency of greater than 4.5 Hz.

Figure 10:
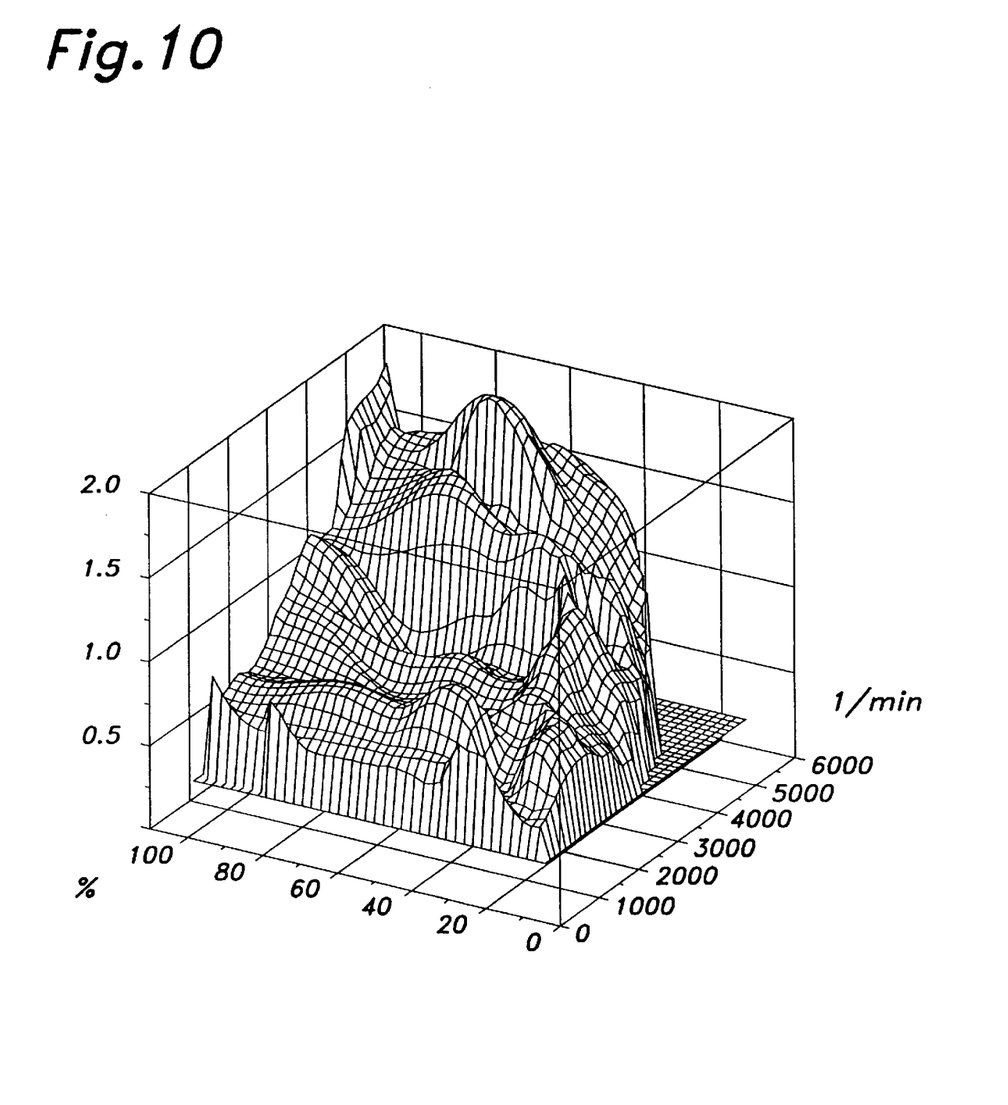
FIG. 10 a diagram showing surge intensity as a function of engine speed and load.

FIG. 10 is a three-dimensional representation showing the amplitude at the characteristic surge frequency as a function of engine speed and throttle position. Engine speed is indicated in 1/min between 0 and 6,000, whereas throttle position is indicated in percent between 0 and 100. The surge amplitude is plotted in units of m/s² on the vertical axis.

Figure 11:
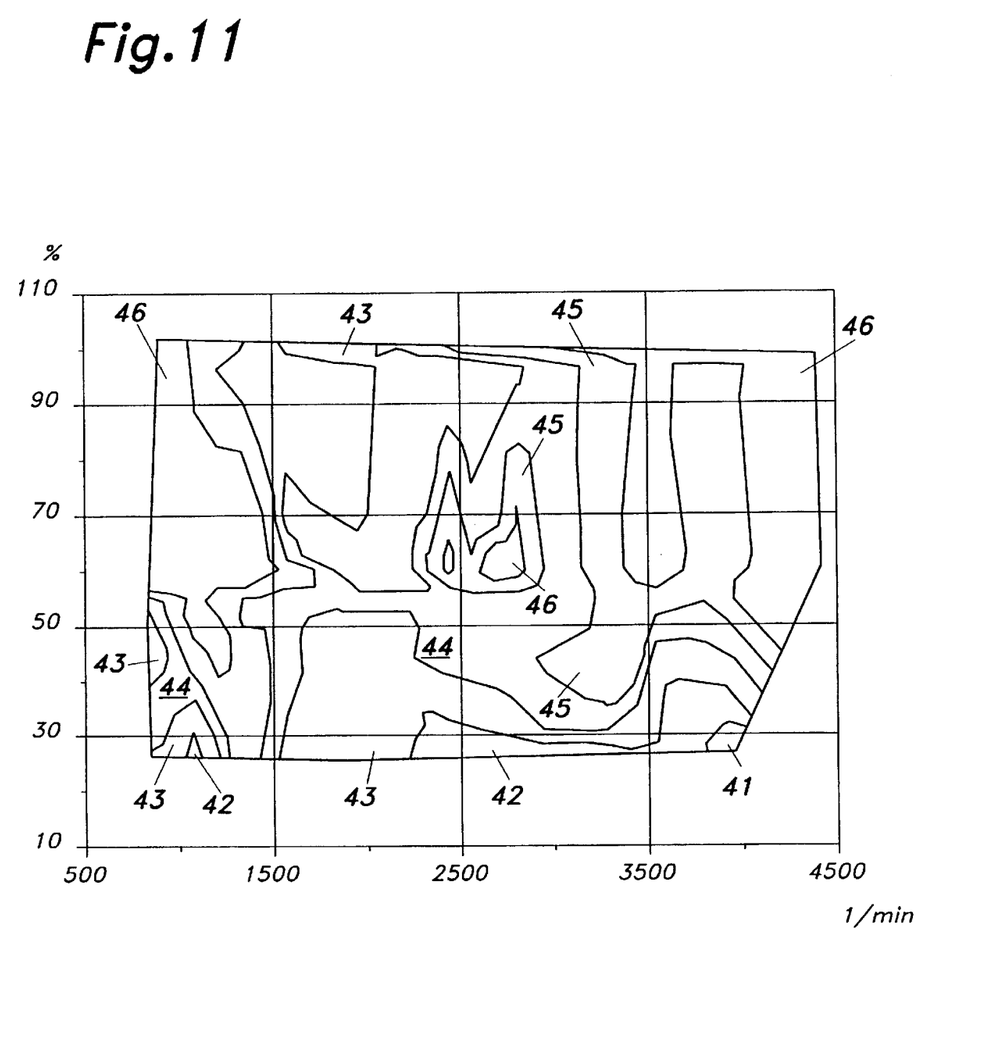
FIG. 11 a diagram showing damping values as a function of engine speed and load.

FIG. 11 is a characteristic diagram representing the damping values set on the dynamic test stand. The horizontal axis again shows engine speed in 1/min, and the vertical axis throttle position in percent. In the following table the value obtained for damping is entered next to the corresponding region as indicated by the reference numerals in FIG. 5.

| Reference | Damping Value |
|-----------|---------------|
| 41 | <0.4 |
| 42 | 0.4–0.45 |
| 43 | 0.45–0.5 |
| 44 | 0.5–0.55 |
| 45 | 0.55–0.6 |
| 46 | >0.6 |

The present invention will permit adjustment and calibration of a dynamic test stand for engines of motor vehicles in such a way that the vehicle's driveability performance can be fully simulated. In this manner a car's future driving behaviour may be represented on the test stand most accurately. Individual driving operations, such as idling, tip-in (sudden acceleration), let-off (sudden deceleration), cruising, acceleration, gearshifting, or overrun can be analysed individually.

What is claimed is:

1. Method for analyzing the driving behaviour of motor vehicles, comprising the following steps:

conducting tests with the use of a real vehicle to obtain measurement variables on its driving performance;

continuously monitoring to check whether predefined trigger conditions are fulfilled;

if trigger conditions are fulfilled, computing at least one rating describing vehicle driveability, from one or more measured values, using a predefined functional relationship; and outputting the rating.

2. Method as claimed in claim 1, wherein the function for computing the driveability rating (Dr) is derived by statistically evaluating statements of test drivers concerning the vehicle's driveability or driving performance.

3. Method as claimed in claim 1, wherein the measurement variables employed are selected from the group of engine speed, position of throttle or accelerator pedal, vehicle speed, longitudinal vehicle acceleration, intake manifold vacuum, coolant temperature, ignition timing, injection volume, lambda value, exhaust gas recirculation rate, and exhaust gas temperature.

4. Method for analyzing the driving behaviour of motor vehicles, comprising the following steps:

preparing a simulation model for a vehicle in order to simulate this vehicle on a dynamic test stand;

conducting tests on the test stand to obtain measured variables on the driving performance of the simulated vehicle;

continuously monitoring to check whether predefined trigger conditions are fulfilled;

if trigger conditions are fulfilled, computing at least one rating describing the driveability of the simulated vehicle, from one or more measured values, using a predefined functional relationship; and outputting the rating.

5. Method as claimed in claim 4, wherein a simulation model is prepared to exhibit the dependencies between individual measurement variables and, in particular, to compute the driveability rating from a set of predefined measured variables, which can be obtained both with the actual vehicle and on a test stand, and wherein a dynamic test stand is calibrated with the use of the simulation model.

6. Method as claimed in claim 4, wherein computed values for vehicle-related measurement variables are derived from engine-related measurement variables with the use of the simulation model based on vehicle data.

7. Method as claimed in any of claims 1 to 6, wherein the oscillation amplitude of longitudinal vehicle acceleration at characteristic surge frequencies is used as driveability rating (Dr).

8. Method as claimed in claim 4, wherein calibration of the dynamic test stand comprises the determination of a suitable damping value.

9. Method of analyzing vehicle oscillations, comprising the following steps:

determining surge regions during operation of the actual vehicle, using a characteristic measurement variable, such as longitudinal acceleration;

determining the vehicle's operational state in the surge regions;

dividing the surge regions into a first measuring region and a second measuring region following the first one;

determining a frequency spectrum of the characteristic measurement variable;

determining a frequency within a predefined frequency range, which exhibits the largest difference in the frequency spectrum of the first measuring region relative to the second measuring region;

storing the frequency obtained in the previous step as characteristic surge frequency, together with data on the operational state of the vehicle;

preparing a simulation model for the vehicle, in particular for the vehicle power train;

running tests on a test stand with the use of the simulation model obtained in the previous step, simulating various operational states of the vehicle, and determining a suitable damping value for the respective characteristic surge frequency in each operational state of the vehicle; and storing the respective damping value in dependence of the prevailing operational state.

10. Method as claimed in claim 9, wherein the damping value is obtained on the test stand by means of the oscillation amplitude at the characteristic surge frequency.

11. Method as claimed in claim 9, wherein a duration of 0.8 to 2.5 seconds is chosen for the first measuring region.

12. Method as claimed in claim 9, wherein a duration of 1 to 2 seconds is chosen for the first measuring region.

13. Method as claimed in any of claims 1, 4 or 9, wherein the driveability ratings are assigned with the use of mathematical and statistical routines, reference computations, fuzzy logic procedures, or neural nets.

14. Method as claimed in any of claims 1, 4 or 9, wherein from the complete set of data for driveability ratings in all operational states processed an overall driveability index is computed statistically, the weighting of the influence of individual operational states on the overall index being dependent on the type of driver.

15. Device for rating the driveability of motor vehicles, comprising the following elements:

a measuring system with transducers to determine at least one measurement variable relevant for driveability, from the group of engine speed, throttle position, accelerator pedal position, vehicle speed, longitudinal vehicle acceleration, intake manifold vacuum, coolant temperature, ignition timing, injection volume, coolant temperature, ignition timing, injection volume, lambda value, exhaust gas recirculation rate, exhaust gas temperature, including recording electronically;

a data storage system with data on the operational state of engine or vehicle, and of correlated driveability ratings;

an assigning system for assigning ratings on the driveability of a vehicle to the data describing the operational state; and an evaluation unit for comparing measured and stored data, and for determining driveability ratings with the use of the assigning system.

16. A device as claimed in claim 15, wherein a filter for passing or blocking frequency bands is provided, in order to omit frequencies of longitudinal vehicle acceleration of less than 0.5 Hz and more than 8 Hz, from data recording and evaluation.

17. A device as claimed in any of claims 15 or 16, wherein a unit is provided for simulating driveability-relevant vehicle test data with the use of engine-related test data.

* * * * *